J. F. GEGENHEIMER.
APPARATUS FOR MAKING HOLLOW GLASS ARTICLES.
APPLICATION FILED FEB. 27, 1915.
1,212,135.
Patented Jan. 9, 1917.
3 SHEETS—SHEET 1.
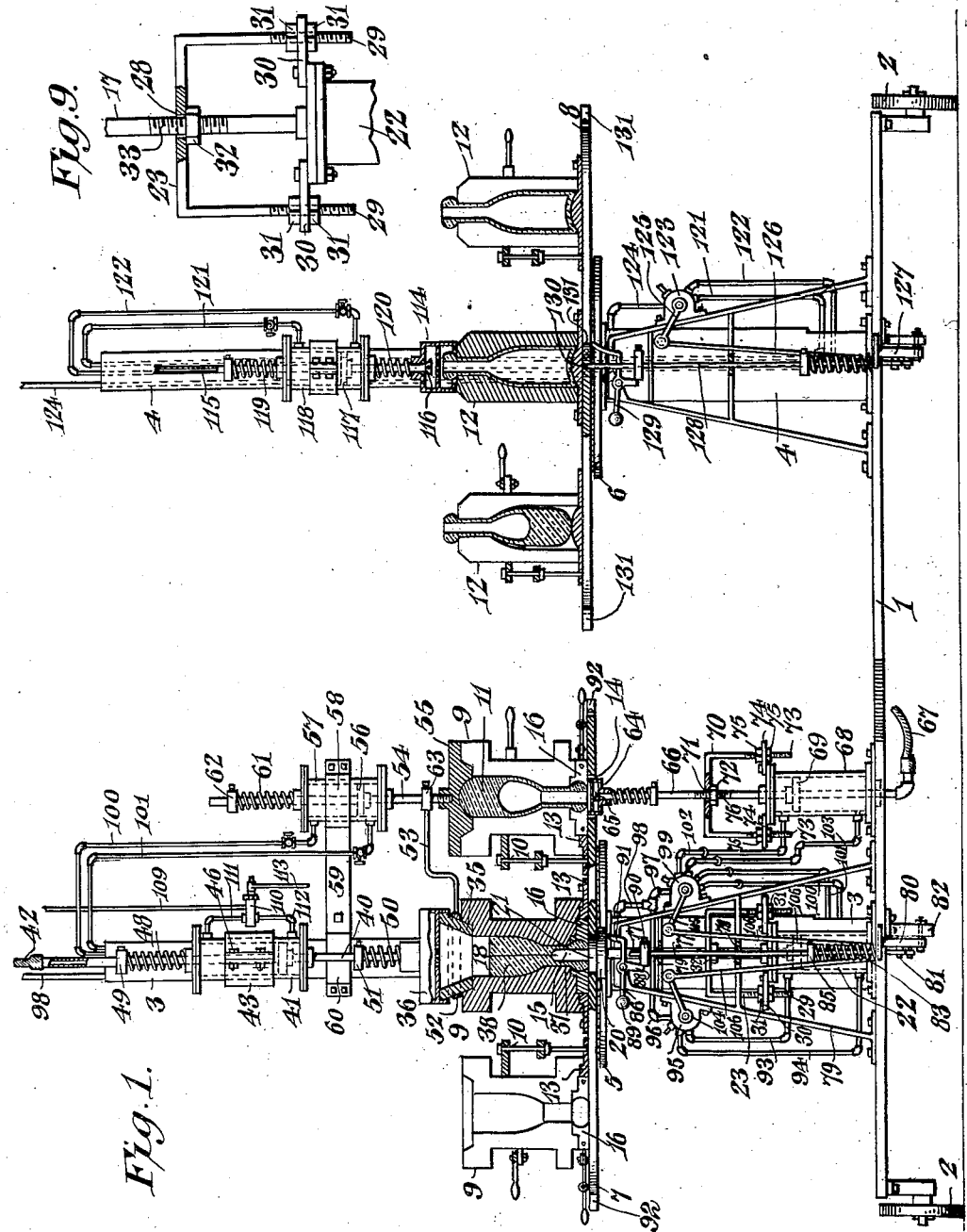
WITNESSES
John F. Gegenheimer, INVENTOR
BY
ATTORNEY

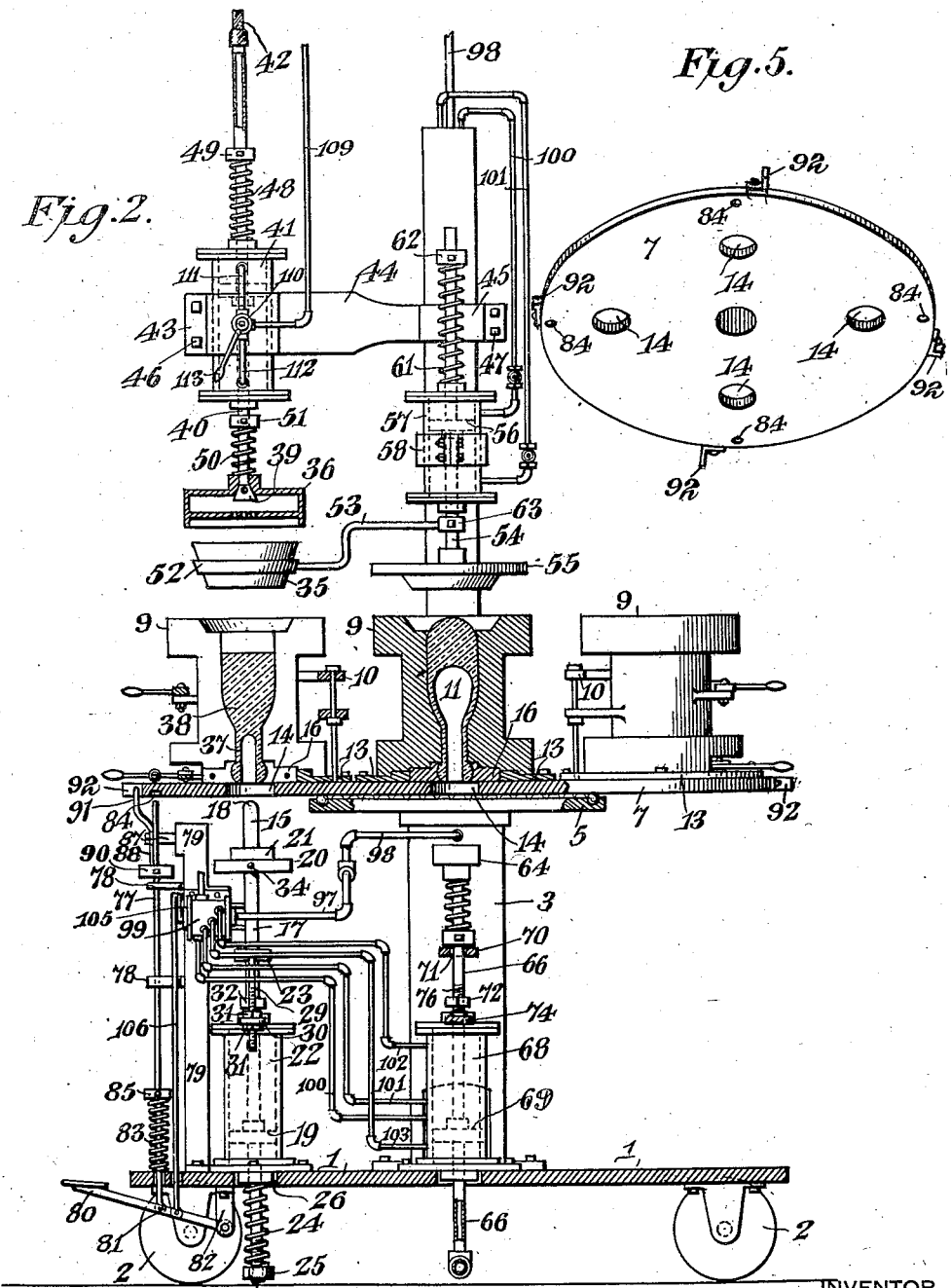

J. F. GEGENHEIMER.
APPARATUS FOR MAKING HOLLOW GLASS ARTICLES.
APPLICATION FILED FEB. 27, 1915.
1,212,135. Patented Jan. 9, 1917.
3 SHEETS—SHEET 3.
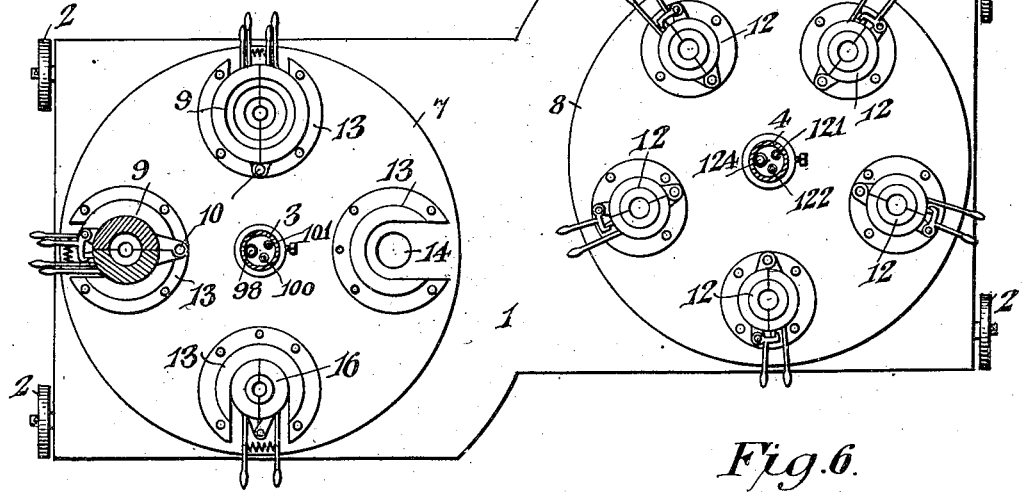
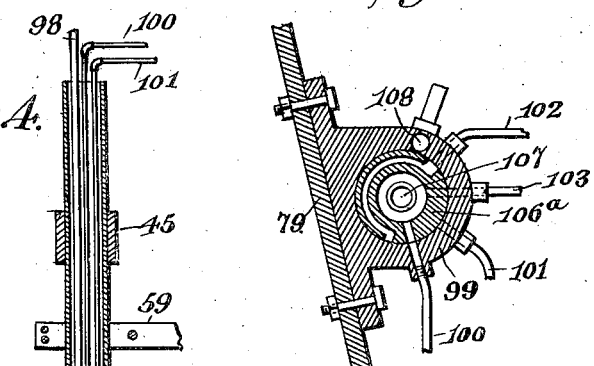
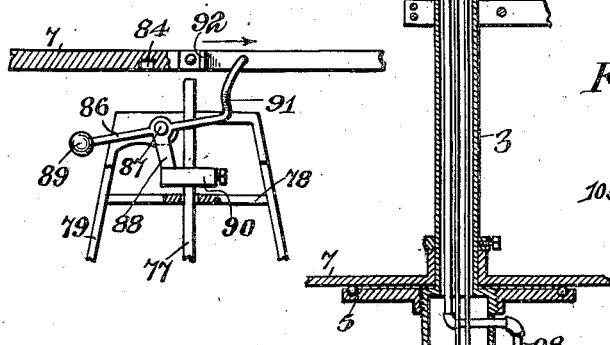
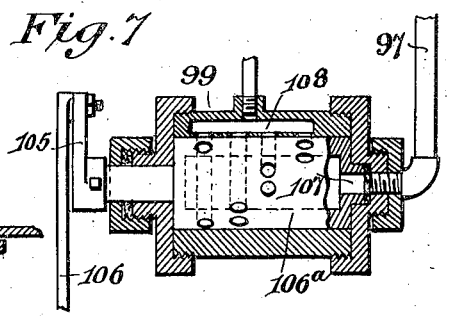
John F. Gegenheimer,
INVENTOR
WITNESSES
BY
ATTORNEY

UNITED STATES PATENT OFFICE.

JOHN F. GEGENHEIMER, OF JEANNETTE, PENNSYLVANIA.

APPARATUS FOR MAKING HOLLOW GLASS ARTICLES.

1,212,135.  Specification of Letters Patent.  Patented Jan. 9, 1917.

Application filed February 27, 1915. Serial No. 11,016.

*To all whom it may concern:*

Be it known that I, JOHN F. GEGEN-HEIMER, a citizen of the United States, residing at Jeannette, in the county of Westmoreland and State of Pennsylvania, have invented a new and useful Apparatus for Making Hollow Glass Articles, of which the following is a specification.

The invention relates to improvements in apparatus for making hollow glass articles.

The object of the present invention is to improve the construction of apparatus for making hollow glass articles and to provide a simple, practical, and comparatively inexpensive apparatus designed principally for the manufacture of narrow neck bottles and equipped with means for accurately molding the neck or ring portion of a bottle or analogous receptacle to form a partially finished blank, and then, without changing the position of the mold with relation to the table, blowing the partially formed blank into a complete blank of the full length of a finished bottle, whereby the blank may be readily transferred to a blowing mold for completing the bottle without liability of spoiling the blank while changing the same from one mold to the other.

A further object of the invention is to provide an apparatus of this character capable of being easily and quickly operated and adapted to enable bottles to be rapidly manufactured at a minimum cost of production.

With these and other objects in view the invention consists in the construction and novel combination of parts hereinafter fully described, illustrated in the accompanying drawing, and pointed out in the claims hereto appended, it being understood that various changes in the form, proportion, size and minor details of construction, within the scope of the claims, may be resorted to without departing from the spirit or sacrificing any of the advantages of the invention.

In the drawing: Figure 1 is an elevation, partly in section, of a glass molding and blowing apparatus constructed in accordance with this invention. Fig. 2 is an end elevation, partly in section, of the blank forming mechanism. Fig. 3 is a horizontal sectional view of the apparatus. Fig. 4 is a vertical sectional view through the column of the blank forming mechanism. Fig. 5 is a detail view of the rotary table of the blank forming mechanism. Figs. 6 and 7 are detail views illustrating the construction of one of the controlling valves of the blank forming mechanism. Fig. 8 is a detail sectional view illustrating the construction of the locking means for holding the rotary tables. Fig. 9 is a detail view illustrating the construction of the adjustable yoke for limiting the movement of the piston rods.

Like numerals of reference designate corresponding parts in all the figures of the drawings.

In the accompanying drawings, in which is illustrated the preferred embodiment of the invention, 1 designates a platform or base mounted upon wheels 2 to render the apparatus portable, and provided at spaced points with hollow vertical columns 3 and 4 rigidly mounted upon the base or platform and equipped at a suitable height above the same with ball bearing brackets 5 and 6 for supporting rotary tables 7 and 8. The rotary tables may, however, be mounted in any other desired manner, and the table 7, on which the blanks are molded and blown, carries a series of inverted blank molds 9, composed of separable sections hinged together at 10 at their inner side edges and adapted to open to permit the blanks 11 to be transferred from the blank forming molds 9 to a series of blowing molds 12 of the rotary table 8.

The blank forming molds 9 are seated upon base plates 13 secured upon the table 7 around openings 14 thereof, through which is projected a vertically movable core plug 15. The core plug 15, which is adapted to extend to a greater or less extent into the inverted blank molds, is arranged to coöperate with the same to form the ring or neck portion of the bottle blank, as clearly illustrated in Fig. 1 of the drawing. A neck ring 16 of the ordinary construction is arranged upon the table 7 within the circular baseplate and constitutes a means for transferring the finished blank from the molds 9 to the blowing molds 12. The core plug 15, which is carried by a vertical piston rod 17, is circular in cross section to form the neck of a bottle interiorly cylindrical to provide for proper corkage of the bottle, and the upper end 18 is preferably rounded as shown. The piston rod 17 carrying a piston 19, is equipped at a point intermediate of its ends with a mold head 20 consisting of a block or piece preferably of circular form, provided with a reduced circular portion 21 fitting within the opening 16 and forming a seat for the core plug 15. The mold head 20 is suitably secured to the piston rod, which extends through both ends of a vertical cylinder 22, bolted or otherwise secured to the base or platform 1.

The piston head 19 is acted upon by fluid pressure to reciprocate the piston rod and raise and lower the core plug for carrying the same to and from the blank molds, and the upward movement of the core plug and the piston rod is limited by an adjustable yoke 23 and is cushioned by a spring 24 mounted on the lower portion of the piston rod and interposed between the lower end of the cylinder and an adjusting nut 25. The lower portion of the piston rod is adapted to extend through an opening 26 of the platform or base 1 and project below the same and the nut 25 is mounted on the lower end 27 of the piston rod, which is threaded for varying the tension of the spring. The cushioning spring retards the upward movement of the piston rod and cushions the seating of the mold head 20 against the table 7 to avoid jarring the same. The adjustable yoke 23, which is approximately inverted U-shaped, is composed of straight sides and a connecting top portion which is provided with a central opening 28, through which passes the piston rod 17. The lower portions 29 of the yoke are threaded and are adjustably secured to arms 30 of the cylinder 22 by nuts 31 arranged in pairs and located at the upper and lower faces of the arms 30. The arms 30, which are rigid with the cylinder 22, extend horizontally from the upper end thereof at opposite sides of the same and are suitably connected at their inner ends to the said cylinder. The yoke is adapted to be adjusted to raise and lower its upper connecting portion, which is arranged in the path of a stop 32 preferably consisting of a nut engaging a threaded intermediate portion 33 of the piston rod 17, but any other suitable stop may, of course, be employed. Through the adjustment of the stop and the yoke the core plug may be limited in its upward movement and the head 20, which is detachably secured to the piston rod 17 by a suitable fastening device 34, is adjustable and also may be removed from the piston rod to enable core plugs of different sizes to be employed. The blank molds are also detachable and various forms of molds and coacting core plugs may, of course, be employed.

When the neck ring, the blank mold, and the core plug are in proper position, a charge of glass is deposited in the mold at the top of which has been placed, by means hereinafter described, a funnel 35. A blowing head 36 is then lowered upon the funnel and compressed air is admitted to the blank mold for forcing the glass around the core plug to form the ring or neck portion 37 of the blank 38, which then assumes the form shown at the left hand side of the blank forming mechanism. By forcing the glass around the core plug by fluid pressure, an accurately formed neck or ring portion 37 is thereby produced. The blowing head 36, which is of the ordinary construction, is equipped with an automatic spring controlled valve 39, which is carried by the lower end of an upper vertically movable hollow piston rod 40 extending through both ends of an upper cylinder 41 and connected at its upper end with a flexible compressed air supply pipe 42. The cylinder 41 is adjustably mounted in an outer clamp 43 of a horizontal supporting arm 44, extending from the upper portion of the column 3 and adjustably mounted thereon by means of an inner clamp 45. The outer clamp 43 and the inner clamp 45 are provided with suitable clamping bolts 46 and 47 by means of which the upper cylinder 41 and its piston rod may be properly positioned with relation to the blank forming molds. This adjustment is adapted to accommodate the mechanism to blank molds of different sizes. The downward movement of the piston rod 40 is retarded and cushioned by a coiled spring 48, mounted on the upper portion of the said piston rod 40 and interposed between the end of the cylinder 41 and the set collar 49, adjustable on the piston rod 40 for varying the tension of the cushioning spring 48. The cushioning spring 48 enables the blowing head to be placed upon the funnel of a blank mold without jarring the same. The lower portion of the piston rod 40 carries a lower coiled spring 50, interposed between the blowing head 36 and a set collar 51, and adapted to yieldably maintain the blowing head at the limit of its downward movement. The lower spring 50 maintains the automatic valve in its closed position and permits a relative movement of the piston rod and the blowing head to open and close the valve.

The funnel 35, which is tapered downwardly, as shown, is seated within a tapering ring 52 carried by an arm 53 extending horizontally from the lower portion of a vertical piston rod 54, which also carries a plate 55 constituting a head or bottom for the blank forming molds and adapted to shape or form the bottom of the blank, as clearly illustrated at the right hand side of the blank forming mechanism in Fig. 1 of the drawings. After the neck or ring portion of the bottle has been formed by the core plug and the mold, the core is withdrawn from the lower end of the mold and the funnel and the blowing head are lifted from the upper end of the same to permit the table 7 to be rotated a sufficient distance to carry the partially formed blank to a point beneath the plate or head 55. The piston rod 54, which is provided between its ends with a piston 56, passes through and projects above and below an upper cylinder 57, adjustably mounted in an outer clamp 58 of a horizontal arm 59, which is adjustably secured to the column 3 by an inner clamp 60. The clamps 58 and 60, which are preferably constructed substantially the same as the clamps 43 and 47 of the arm 44, enable the arm 59 and the cylinder 57 to be adjusted to arrange the cylinder 57, the piston rod 54, and the plate or head 55 in proper position with relation to the blank molds of the table 7. The piston rod, which is reciprocated to carry the plate or head 55 and the funnel 35 simultaneously to and from the blank molds, is equipped at its upper portion with a coiled cushioning spring 61, interposed between the upper end of the cylinder 57 and a set collar 62. The coiled spring 61 is adapted to cushion the piston rod 54 in its downward movement to prevent the plate or head 55 from jarring the blank mold when placed thereon. The arm 53, which carries the funnel 35, is provided at its inner end with a set collar 63, adapted to be adjusted along the piston rod to arrange the funnel in proper position with relation to the blank molds.

Simultaneously with the insertion of the core plug 15 and the placing of the funnel and the plate or head 55 on the blank molds, a lower blowing head 64 is carried upward into the openings 14 at the lower end of the mold, which is capped by the plate 55. The blowing head 64, which is provided with an automatic spring controlled valve 65, is mounted on a lower hollow vertically disposed piston rod 66, which is connected at its lower end with a flexible fluid pressure supply pipe 67. When the valve 65 opens, the partially formed blank is blown by fluid pressure into a blank the complete length of the blank mold, and shaped as illustrated at the middle of Fig. 2 of the drawings. This enables the completed blank, when removed from the blank mold, to be placed in the blowing mold and to rest upon the bottom thereof with its neck at the top of the mold so that there will be no liability of injuring the blank, which may then be readily blown into a complete finished bottle. The piston rod 66, which extends entirely through a lower cylinder 68, is provided at an intermediate point with a piston head 69, and it is limited in its upward movement by an adjustable approximately inverted U-shaped yoke 70, provided with a central opening 71 for the passage of the piston rod 66 and engaged by a stop 72, which is carried by the piston rod 66. The yoke 70, which has the lower portions 73 of the sides threaded, is adjustably secured to oppositely projecting horizontal arms 74 of the cylinder 68 by upper and lower nuts 75. The stop 72 preferably consists of a nut mounted on a threaded intermediate portion 76 of the piston rod 66. By adjusting the piston rod and the stop, the upward movement of the blowing head may be limited to cause the blowing head 64 to travel upwardly the desired distance.

The table 7, which is rotated by hand to carry the molds from the blank molding point or station to the blank blowing station, is held against rotary movement by a vertically disposed locking rod 77, slidable in suitable guides 78 of a standard or support 79 and connected at its lower end with a treadle or foot lever 80. The treadle or foot lever 80, which is pivotally connected at an intermediate point at 81 to the lower end of the locking rod, is fulcrumed at its lower end to a bracket 82 which depends from the platform or base 1. The foot lever or treadle extends outwardly beyond the base and is adapted to be depressed by the foot of the operator against the action of a coiled spring 83 to withdraw the upper end of the locking rod from one of a series of sockets 84 of the table 7. The coiled spring 83, which is disposed on the lower portion of the locking rod, is interposed between a set collar 85 and the table or platform, and is adapted to urge the locking rod upwardly to carry the same into engagement with one of the sockets 84 of the table when the locking rod is free to engage the same. The sockets 84, which are formed in the underside of the table, are preferably arranged in radial alinement with the openings 14 and when the locking rod is moved downwardly to permit the table to be partially rotated, the locking rod is held in a depressed position below the table by means of a gravity latch 86. The gravity latch 86 consists of a rod or stem pivoted at an intermediate point at 87 to the standard or support 79, and provided at the pivot with an engaging arm 88 which is carried by a weight 89 into the path of a stop 90, consisting of a set collar or other suitable means mounted on the upper portion of the locking rod. When the locking rod is at the limit of its upward movement and in engagement with one of the sockets of the table 7, the stem of the locking rod is approximately horizontal and the arm 88, which depends from the latch, is located at one edge of the stop 90 and by contact with the same, maintains the latch in such position. As soon as the locking rod is withdrawn from the engaged socket of the table, the set collar is moved downwardly below the lower end of the locking arm 88, which is swung inwardly by the weight 89 to retain the locking rod in its depressed position out of engagement with the table. The weight 89 is arranged at one end of the stem, which is provided at its other end with an upwardly extending curved tripping arm 91, which is located in the path of a series of lugs or projections 92 carried by the table and adapted to successively engage the said arm 91 to tilt the latch and swing the locking arm out of engagement with the stop 90. The lug 92 is located in advance of its respective socket, and is properly positioned so that when the latch is tripped by the lug, the locking rod will be carried into engagement with the socket by the action of the spring 83.

The lower cylinder 22 is connected at its upper and lower ends by pipes 93 and 94 with a controlling valve 95, to which extends one of a pair of branches 96 and 97 of a supply pipe 98. The other branch 97 of the fluid pressure supply pipe 98 extends to a controlling valve 99 having pipes 100, 101, 102, and 103, which lead to the upper and lower ends of the upper and lower cylinders 57 and 68. The controlling valves 95 and 99, which are mounted on the standard or support 79 at opposite sides thereof, are provided with operating arms 104 and 105, which are connected by rods 106 with the foot lever or treadle, whereby the said controlling valves are operated simultaneously with the locking rod. When the locking rod is withdrawn the arms of the controlling valves are swung downward and fluid pressure is admitted to the upper ends of the lower cylinders and to the lower end of the upper cylinder 57, for moving the piston rods of the said cylinders to the positions illustrated in Fig. 2 of the drawing. The controlling valves, which may be of any preferred construction, are preferably of the rotary type of the character illustrated in Figs. 6 and 7 of the drawings, and when the rotary valve member 106ª is in one position, one set of its pipe connections is in communication with the feed port 107, and the other set of its pipe connections is in communication with its exhaust port 108, so that when fluid pressure is supplied to one end of a cylinder, it will be exhausted from the other end thereof. The upper cylinder 41 is controlled by fluid pressure from a separate supply pipe 109 extending to a controlling valve 110 having pipe connections 111 and 112 leading to the upper and lower ends of the cylinder 41. The valve 110 is operated by an arm or lever 113 to admit fluid pressure to one end of the cylinder 41 and to exhaust the pressure from the other end of such cylinder.

The two steps in the formation of the blank are simultaneously performed on different blanks and after the completed blank has been transferred from the blank mold in which it was formed to one of the blow molds 12, fluid pressure is supplied to such blow mold by a blowing head 114, to blow the blank into a complete finished bottle, as illustrated at the right hand end of Fig. 1 of the drawings. The blowing head 114, which is carried by a vertically disposed piston rod 115, is of the ordinary construction and provided with an automatic spring controlled valve 116. The piston rod, which is provided at an intermediate point with a piston head 117, passes through and extends above and below a cylinder 118, and it is equipped at its upper and lower portions with coiled springs 119 and 120, functioning substantially the same as the upper and lower springs of the piston rod 40 to cushion the downward movement of the piston rod 115 and control the valve 116. The fluid pressure is supplied to the upper and lower ends of the cylinder 118 by pipes 121 and 122 leading from the cylinder 118 to a controlling valve 123, which is also connected with a supply pipe 124. The hollow columns 3 and 4 receive and partially house the pipe connections extending from the valves to the upper cylinders and from the said valves to the source of fluid pressure supply. The controlling valve has an operating arm 125 similar to the controlling valves 95 and 99, and it is connected by a rod 126 with a foot lever or treadle 127. A foot lever or treadle is also adapted to operate simultaneously a locking rod 128 constructed similar to the locking rod heretofore described, and coacting with a gravity latch 129, which is similar in construction and operation to the latch 86. The rotary table 8, which supports the blow molds, is provided with sockets 130 to receive the locking rod, and lugs 131 for tripping the gravity latch 129.

What is claimed is:

1. In an apparatus for making hollow glass articles, a movable table, a row of inverted molds carried by the table, a fluid pressure operated core plug arranged beneath one of the molds for engagement up into the same, a fluid pressure operated supply funnel arranged over said mold to direct a quantity of molten glass thereto, a fluid pressure operated plate arranged above the second mold and adapted to close the latter, a fluid pressure operated means beneath said second mold for blowing into the same, means for locking the table at each step of the consecutive advancement of the row of molds, and a single operating means connected to said table locking means and to all of said fluid pressure operated devices to consecutively actuate all of the same by a single operation of the single operating means.

2. An apparatus of the class described including a rotary table, an inverted blank mold carried by the table, a core plug mounted beneath the table and movable to and from the lower end of the mold, a funnel located above and movable to and from the upper end of the mold, a blowing head also arranged above the mold and movable to and from the funnel, and fluid pressure mechanism connected with the core plug, the funnel, and the blowing head for actuating the same.

3. In an apparatus for making hollow glass articles, a table having a mold thereon, a cylinder above the table, a vertically movable piston rod in the cylinder and projecting from one end thereof, a funnel connected to said piston rod and overhanging said mold for moving toward and from the same by the reciprocation of the piston rod, and an independently operated blowing head overhanging the funnel and adapted to be moved downwardly thereagainst when said funnel is in its lowered position to blow into said mold.

4. In an apparatus for making hollow glass articles, a rotary table provided with a number of inverted blank molds, a core plug movable toward and from one of said molds, a funnel arranged above said mold and being movable toward and from the same, a blowing head arranged above said mold and said funnel and adapted to be moved toward and from the funnel, a blowing head arranged beneath the table in register with a second one of said molds, a closure plate adapted for movement toward and from the upper end of said second mold, locking means for said table to secure it at each advancement of the molds, controlling mechanism for simultaneously raising said core plug and said second blowing head against the lower ends of the respective molds, and lowering said funnel and said closure plate against the upper ends of the respective molds, and independent means for moving said first blowing head toward and from the funnel.

5. An apparatus of the class described including a table, a plurality of molds supported by the table, a cylinder having a vertically disposed piston rod located above one of the molds, a plate or head carried by the piston and coöperating with such mold, and a funnel located above another mold and connected with and carried by the said piston, whereby the head or plate and the funnel are simultaneously carried to and from the said molds.

6. An apparatus of the class described including a table, a plurality of molds supported by the table, a cylinder located above one of the molds and having a vertically movable piston rod, a plate or head carried by the piston rod and located above such mold, an arm extending from the piston rod to another mold, a funnel mounted on the arm, and means for supplying fluid pressure to the cylinder for simultaneously moving the plate and the funnel to and from the said molds.

7. An apparatus of the class described including a table, a plurality of molds supported by the table, a cylinder located above one of the molds and having a vertically movable piston rod, a plate or head carried by the piston rod and located above such mold, an arm secured to the piston rod and extending therefrom, said arm being provided above another mold with a tapered ring, a funnel fitted within the tapered ring, and means for supplying fluid pressure to the cylinder for simultaneously moving the plate and the funnel to and from the said molds.

8. An apparatus of the class described including a table, a plurality of molds supported above the table, a cylinder arranged above one of the molds and provided with a piston rod having a plate or head arranged to coöperate with such mold, a funnel carried by the piston rod and arranged above another mold, means for supplying fluid pressure to the cylinder to simultaneously carry the plate or head and the funnel to and from the said molds, a second cylinder located above the funnel and having a piston rod, and operating independently of the first mentioned piston rod, and a blowing head mounted on the independently operated piston rod and carried to and from the funnel by the same.

9. An apparatus of the class described including a table, a plurality of molds supported by the table, upper and lower blowing heads arranged above one of the molds and beneath another mold, a plate or head arranged above and in the vertical plane of the lower blowing head to coöperate with the adjacent mold, a core plug located beneath the other mold, fluid pressure means for simultaneously actuating the lower blowing head, the plate or head, and the core plug, and a funnel connected with the said plug, and a funnel connected above and movable to and means and located above and movable to and from the mold with which the core plug coöperates.

10. An apparatus of the class described including a table, a plurality of molds supported by the table, upper and lower blowing heads arranged above one of the molds and beneath another mold, a plate or head arranged above and in the vertical plane of the lower blowing head to coöperate with the adjacent mold, a core plug located beneath the other mold, fluid pressure means for simultaneously actuating the lower blowing head, the plate or head, and the core plug, a funnel connected with the said means and located above and movable to and from the mold with which the core plug coöperates, and an independently operable plate or head located above and movable to and from the funnel.

11. An apparatus of the class described including a table, a mold supported by the table, a cylinder arranged beneath the table and having a vertically movable piston rod, a device carried by the piston rod to and from the mold for coöperating therewith, projecting means carried by the piston rod, and an adjustable device mounted on the cylinder and arranged in the path of the said projecting means for limiting the upward movement of the piston rod.

12. An apparatus of the class described including a table, a mold supported by the table, a cylinder arranged beneath the table and having a vertically movable piston rod, a device carried by the piston rod to and from the mold for coöperating therewith, an adjustable yoke mounted on the cylinder and having an opening through which the piston rod passes, and means carried by the piston rod and arranged to engage the yoke for limiting the movement of the piston rod.

13. An apparatus of the class described including a table, a mold supported by the table, a vertical cylinder provided with oppositely projecting arms, a vertically movable piston rod having a head operating in the cylinder, a device mounted on the piston rod and carried by the same to and from the mold, a yoke provided at an intermediate point with an opening through which the piston rod passes, the sides of the yoke being threaded and piercing the arms, nuts mounted on the threaded portions of the yoke and adjustably securing the latter to the arms, and an adjustable stop mounted on the piston rod and arranged to be engaged by the yoke.

14. In an apparatus for making hollow glass articles, a mold, a fluid pressure operated core plug arranged beneath the mold and adapted to be raised into the lower end of the same, a fluid pressure operated funnel arranged above the mold and adapted to be moved down to project thereinto and to be raised above the same, a single controlling means connected to both fluid pressure operated devices for simultaneously advancing the core plug into the lower end of the mold and moving said funnel down into engagement with the upper end of the mold whereby a quantity of molten glass may be poured into the mold, and an independently operated blowing head arranged over the mold and over the funnel and adapted to be lowered into contact with the funnel and into communication with the upper end of the mold.

In testimony, that I claim the foregoing as my own, I have hereto affixed my signature in the presence of two witnesses.

JOHN F. GEGENHEIMER

Witnesses:
 JAMES W. BUGHER,
 JOHN STRAHLEY.